US012768308B2

(12) United States Patent
Noguchi et al.

(10) Patent No.: US 12,768,308 B2
(45) Date of Patent: Oct. 20, 2026

(54) BUTTERFLY VALVE

(71) Applicant: OILES CORPORATION, Fujisawa (JP)

(72) Inventors: Takuma Noguchi, Fujisawa (JP); Eiji Satou, Fujisawa (JP); Takenori Okawa, Fujisawa (JP)

(73) Assignee: OILES CORPORATION, Fujisawa (JP)

( * ) Notice: Subject to any disclaimer, the term of this patent is extended or adjusted under 35 U.S.C. 154(b) by 48 days.

(21) Appl. No.: 18/728,215

(22) PCT Filed: Jan. 19, 2023

(86) PCT No.: PCT/JP2023/001584
§ 371 (c)(1),
(2) Date: Jul. 11, 2024

(87) PCT Pub. No.: WO2023/145614
PCT Pub. Date: Aug. 3, 2023

(65) Prior Publication Data
US 2025/0101924 A1 Mar. 27, 2025

(30) Foreign Application Priority Data
Jan. 27, 2022 (JP) ................................ 2022-011067

(51) Int. Cl.
*F02D 9/10* (2006.01)
*F02D 9/04* (2006.01)
(Continued)

(52) U.S. Cl.
CPC ........... *F02D 9/106* (2013.01); *F02D 9/1085* (2013.01); *F02D 9/04* (2013.01); *F02D 9/06* (2013.01); *F16K 1/224* (2013.01); *F16K 27/0218* (2013.01)

(58) Field of Classification Search
CPC . F01L 7/16; F02D 9/106; F02M 26/70; F16K 1/22; F16K 1/224; F16K 1/2268; F16K 27/0218
(Continued)

(56) References Cited

U.S. PATENT DOCUMENTS 4,420,140 A * 12/1983 Gachot ..................... F16K 1/22 251/307
5,018,548 A * 5/1991 McLennan .............. F16L 17/04 285/411
(Continued)

FOREIGN PATENT DOCUMENTS

DE 10329336 A1 1/2005
DE 102004032856 A1 2/2006
(Continued)

OTHER PUBLICATIONS

International Search Report and Written Opinion mailed Mar. 7, 2023 in International Application No. PCT/JP2023/001584, in 12 pages.
(Continued)

*Primary Examiner* — Robert K Arundale
(74) *Attorney, Agent, or Firm* — Knobbe, Martens, Olson & Bear, LLP

(57) ABSTRACT

Proposed is a butterfly valve for minimizing leak of exhaust gas from an exhaust pipe even under high back pressure. The butterfly valve may include a valve plate provided in the exhaust pipe, a valve shaft crossing the exhaust pipe and holding the valve plate, and a bearing unit slidably supporting the valve shaft and including an annular sealing bush and an annular support bush into which the valve shaft 120 is inserted. The valve may also include a housing attached to the exhaust pipe and accommodating the bearing unit. The support bush is arranged between the housing and the sealing bush and contacts the housing on an outer peripheral
(Continued)

surface of the support bush. The sealing bush contacts the housing on an outer peripheral surface of the sealing bush and contacts a flange of the valve shaft on a valve shaft opposing surface of the sealing bush.

10 Claims, 8 Drawing Sheets

(51) Int. Cl.
*F02D 9/06* (2006.01)
*F16K 1/22* (2006.01)
*F16K 27/02* (2006.01)

(58) Field of Classification Search
USPC ................ 123/188.6, 190.1, 190.4; 251/305, 251/315.08
See application file for complete search history.

(56) References Cited

U.S. PATENT DOCUMENTS 6,016,826 A * 1/2000 Bake ........................ F16K 3/188 251/327
6,111,928 A * 8/2000 Graeff .................. G21C 13/036 376/205
10,920,678 B2 * 2/2021 Delplanque ........... F16K 49/005
2008/0168767 A1 7/2008 Kanazawa et al.
2012/0280161 A1 11/2012 Weidner et al.
2014/0339452 A1 * 11/2014 Weis ...................... F16K 1/2268 251/308
2015/0083956 A1 * 3/2015 Gerards .................. F16K 1/224 251/308
2020/0088113 A1 * 3/2020 Delplanque ........... F16K 31/047
2020/0240523 A1 * 7/2020 Tsuzuki ............... F16J 15/3224
2021/0246841 A1 * 8/2021 Edler ..................... F02D 9/1065

FOREIGN PATENT DOCUMENTS

JP S49-50318 A 5/1974
JP S54-122209 U 8/1979
JP S61-81060 U 5/1986
JP H07-208217 A 8/1995
JP H10-047489 A 2/1998
JP 2004-068869 A 3/2004
JP 2008-169797 A 7/2008
JP 2008-274895 A 11/2008
JP 2011-241864 A 12/2011
JP 2015-523486 A 8/2015
JP 2015-169280 A 9/2015

OTHER PUBLICATIONS

Office Action issued in Japanese Application No. 2022-086264, dated Jan. 20, 2026.
Extended European Search Report issued in EP Application No. 23746827.7, dated Oct. 30, 2025.

* cited by examiner

BUTTERFLY VALVE

The present application is a U.S. national phase application under 35 U.S.C. § 371 of International Application No. PCT/JP2023/001584, filed on Jan. 19, 2023, which claims the benefit of Japanese Patent Application No. 2022-011067 filed on Jan. 27, 2022 in the Japanese Patent Office, the entire disclosure of each of which is incorporated herein by reference.

TECHNICAL FIELD

The present invention relates to a butterfly valve, and more particularly, to a butterfly valve that opens and closes an exhaust pipe communicating with an exhaust port of an engine.

BACKGROUND ART

Conventionally, as an exhaust device (butterfly valve) that controls a flow of exhaust gas in an exhaust pipe communicating with an exhaust port of an engine of an automatic two-wheeled vehicle, there is known an exhaust device comprising: a valve body (valve plate) arranged in the exhaust pipe; a valve shaft that is fixed to or integrated with the valve body and is arranged to cross the exhaust pipe; and a pair of bearing members that rotatably support both axial ends of the valve shaft, wherein the valve body is rotated around the valve shaft (for example, in the patent literature 1).

CITATION LIST

Patent Literature

[Patent Literature 1] JP 2008-169797 A (for example, see FIG. 5)

SUMMARY OF INVENTION

Technical Problem

If a butterfly valve as described above is installed in an exhaust pipe communicating with an exhaust port of an engine of an automatic four-wheeled vehicle, since the back pressure will be greater than that in an automatic two-wheeled vehicle, when the valve body closes the exhaust pipe, there is possibility that the bearing member will not be able to withstand a radial load caused by the back pressure.

Then, if the bearing member is changed to a hard material in order to withstand the back pressure from the engine of the automatic four-wheeled vehicle, there is possibility that the sealing performance of the bearing member will deteriorate so that exhaust gas will leak from the gap between the bearing member and the valve shaft and exhaust soot may accumulate between the bearing member and the valve shaft.

This problem of accumulation of exhaust soot becomes even more serious in a case where the engine fuel is biodiesel fuel, as exhaust soot is more likely to be generated than in a case where conventional petroleum fuel is used.

Therefore, the present invention solves the problems of the prior art as described above, and an object of the present invention is to provide a butterfly valve with which the exhaust gas is hard to leak out of the exhaust pipe even under high back pressure.

Solution to Problem

The invention according to claim 1 is a butterfly valve that opens and closes an exhaust pipe communicating with an exhaust port of an engine, comprising: a valve plate provided in the exhaust pipe; a valve shaft that crosses the exhaust pipe and holds the valve plate; a bearing unit that has an annular sealing bush and an annular support bush, which are separate components and into which the valve shaft is inserted, and slidably supports the valve shaft; and a housing that is attached to the exhaust pipe and accommodates the bearing unit arranged outside the exhaust pipe, wherein the support bush of the bearing unit is arranged between the housing and the sealing bush of the bearing unit and is in contact with the housing on an outer peripheral surface of the support bush, and wherein the sealing bush of the bearing unit is in contact with the housing on an outer peripheral surface of the sealing bush and is in contact with a flange of the valve shaft on a valve shaft opposing surface of the sealing bush, and thereby, the problems described above are resolved.

The invention according to claim 2 is that, in addition to the configuration of the butterfly valve according to claim 1, the sealing bush of the bearing unit is softer than the support bush of the bearing unit, and wherein an inner diameter of the sealing bush is larger than or equal to an inner diameter of the support bush, and thereby, the problems described above are resolved.

The invention according to claim 3 is that, in addition to the configuration of the butterfly valve according to claim 1 or 2, axial length of the support bush is longer than axial length of the sealing bush, and thereby, the problems described above are resolved.

The invention according to claim 4 is that, in addition to the configuration of the butterfly valve according to any of claims 1 to 3, the sealing bush is formed from mesh-like metal aggregate woven with metal wires and graphite filled in the metal aggregate, and wherein the metal aggregate is repeatedly bent in the axial direction of the sealing bush, and thereby, the problems described above are resolved.

Advantageous Effect of Invention

According to the butterfly valve in the invention according to claim 1, the sealing bush of the bearing unit is in contact with the housing on an outer peripheral surface of the sealing bush and is in contact with a flange of the valve shaft on a valve shaft opposing surface of the sealing bush. Thereby, since the space between the housing and the bearing unit is sealed and the space between the valve shaft and the bearing unit is also sealed, it is possible to prevent the exhaust gas flowing inside the exhaust pipe from leaking out of the exhaust pipe via the housing.

Further, the support bush of the bearing unit is arranged between the housing and the sealing bush of the bearing unit and is in contact with the housing on an outer peripheral surface of the support bush. Thereby, since the support bush supports the radial load on the valve plate caused by the exhaust gas flowing in the exhaust pipe, even if a high load is applied to the valve plate when the valve plate closes the exhaust pipe, it is possible to prevent deformation, abnormal friction and the like of the sealing bush.

Therefore, even under high back pressure, it is possible to prevent the exhaust gas from leaking out of the exhaust pipe.

According to the butterfly valve in the invention according to claim 2, the sealing bush of the bearing unit is softer than the support bush of the bearing unit. Thereby, compared to the case where the sealing bush is harder than the support bush, since the sealing bush easily deforms by following the shape of the housing or the flange of the valve shaft, in addition to the effect of the invention according to claim 1, it is possible to reliably seal not only between the housing and the bearing unit but also between the valve shaft and the bearing unit.

Further, an inner diameter of the sealing bush is larger than or equal to an inner diameter of the support bush. Thereby, since the valve shaft comes into contact with the inner peripheral surface of the support bush that is harder than the sealing bush before coming into contact with the inner peripheral surface of the sealing bush, even if a high load is applied to the valve plate when the valve plate closes the exhaust pipe, it is possible to reliably support the valve shaft with the support bush.

Therefore, even under high back pressure, it is possible to reliably prevent the exhaust gas from leaking out of the exhaust pipe.

According to the butterfly valve in the invention according to claim 3, axial length of the support bush is longer than axial length of the sealing bush. Thereby, compared to the case where the axial length of the support bush is shorter than the axial length of the sealing bush, since the surface pressure applied to the support bush is reduced when a high load is applied to the valve plate in a state where the valve plate closes the exhaust pipe, in addition to the effect of the invention according to claim 1 or 2, it is possible to further improve the radial load resistance performance of the bearing unit.

According to the butterfly valve in the invention according to claim 4, the sealing bush is formed from mesh-like metal aggregate woven with metal wires and graphite filled in the metal aggregate, and the metal aggregate is repeatedly bent in the axial direction of the sealing bush. Thereby, since the sealing bush expands more easily in the axial direction than in the radial direction and the cushioning properties of the sealing bush in the axial direction are improved, in addition to the effect of the invention according to any of claims 1 to 3, it is possible to further improve the sealing performance between the sealing bush and the flange of the valve shaft.

DESCRIPTION OF EMBODIMENTS

The specific embodiment of a butterfly valve in the present invention may be arbitrary as long as a butterfly valve that opens and closes an exhaust pipe communicating with an exhaust port of an engine comprises: a valve plate provided in the exhaust pipe; a valve shaft that crosses the exhaust pipe and holds the valve plate; a bearing unit that has an annular sealing bush and an annular support bush, which are separate components and into which the valve shaft is inserted, and slidably supports the valve shaft; and a housing that is attached to the exhaust pipe and accommodates the bearing unit arranged outside the exhaust pipe, wherein the support bush of the bearing unit is arranged between the housing and the sealing bush of the bearing unit and is in contact with the housing on an outer peripheral surface of the support bush, and wherein the sealing bush of the bearing unit is in contact with the housing on an outer peripheral surface of the sealing bush and is in contact with a flange of the valve shaft on a valve shaft opposing surface of the sealing bush, and thereby, with this butterfly valve, exhaust gas is hard to leak out of the exhaust pipe even under high back pressure.

For example, the butterfly valve in the present invention is provided in an exhaust pipe communicating with the exhaust port of an engine of an automatic four-wheeled vehicle. However, the butterfly valve of the present invention may be provided not only in an automatic four-wheeled vehicle but also in an automatic two-wheeled vehicle, and the automatic four-wheeled vehicle may be a gasoline vehicle or a diesel vehicle.

That is, the engine with which the exhaust pipe communicates may be a gasoline engine or a diesel engine.

Here, diesel engines used in trucks generally have higher back pressure than gasoline engines used in passenger cars. However, the butterfly valve according to the present invention can sufficiently suppress leakage of exhaust gas out of the exhaust pipe.

Example 1

Hereinafter, a butterfly valve 100 according to the first example of the present invention will be described below based on FIGS. 1 to 4.

<1. Installation Environment of Butterfly Valve>

First, the environment in which the butterfly valve 100 is installed will be described based on FIG. 1, which is a perspective view of an exhaust pipe incorporating a butterfly valve according to the first example of the present invention.

Figure 1:
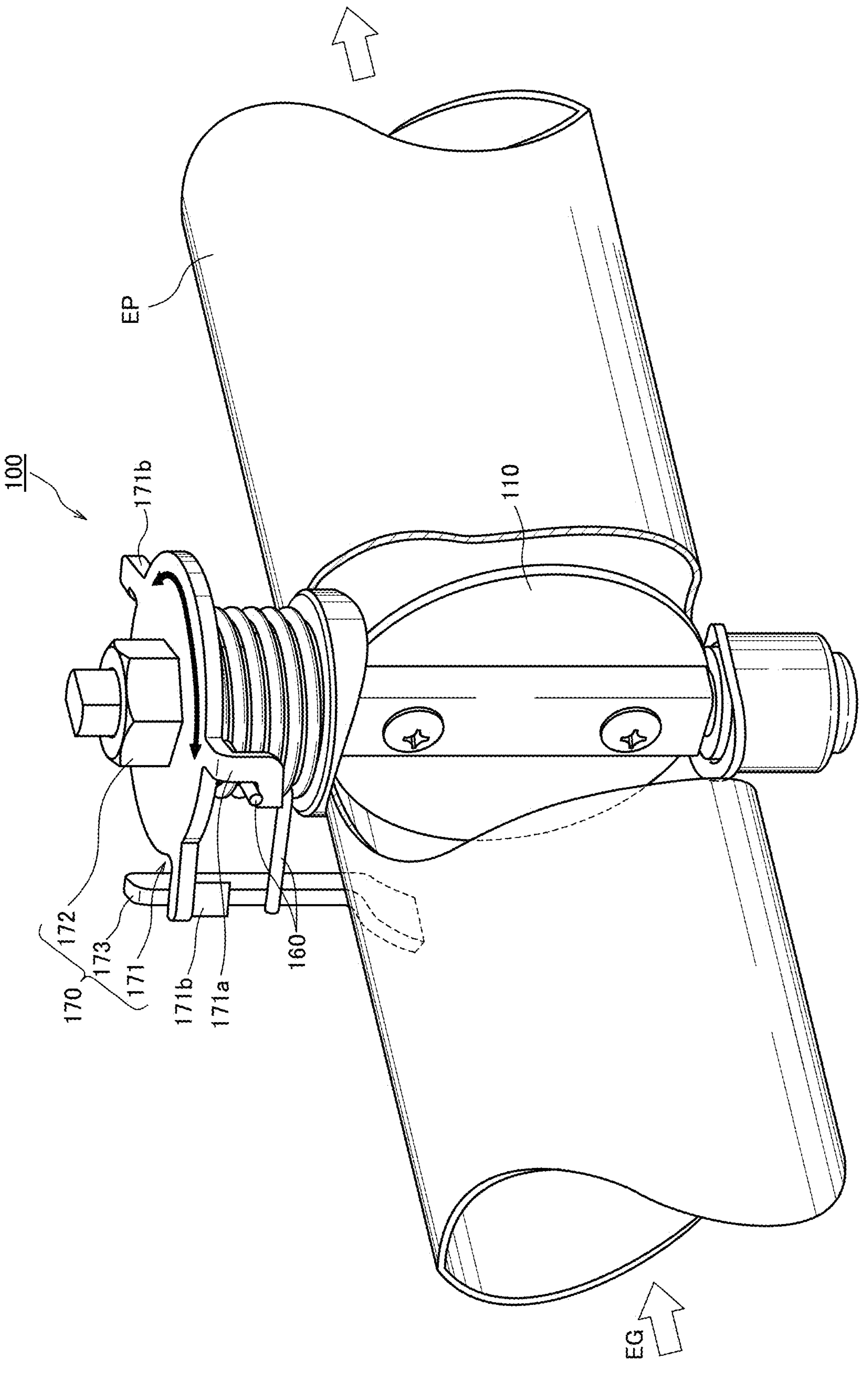
FIG. 1 is a perspective view of an exhaust pipe incorporating a butterfly valve according to the first example of the present invention.

The butterfly valve 100 of the present example opens and closes an exhaust pipe EP communicating with an exhaust port (not shown) of a diesel engine of an automatic four-wheeled vehicle, and is arranged in the middle of the cylindrical exhaust pipe EP as shown in FIG. 1.

<2. Structure of Butterfly Valve>

Next, the structure of the butterfly valve 100 will be described based on FIGS. 1 to 4.

Figure 2:
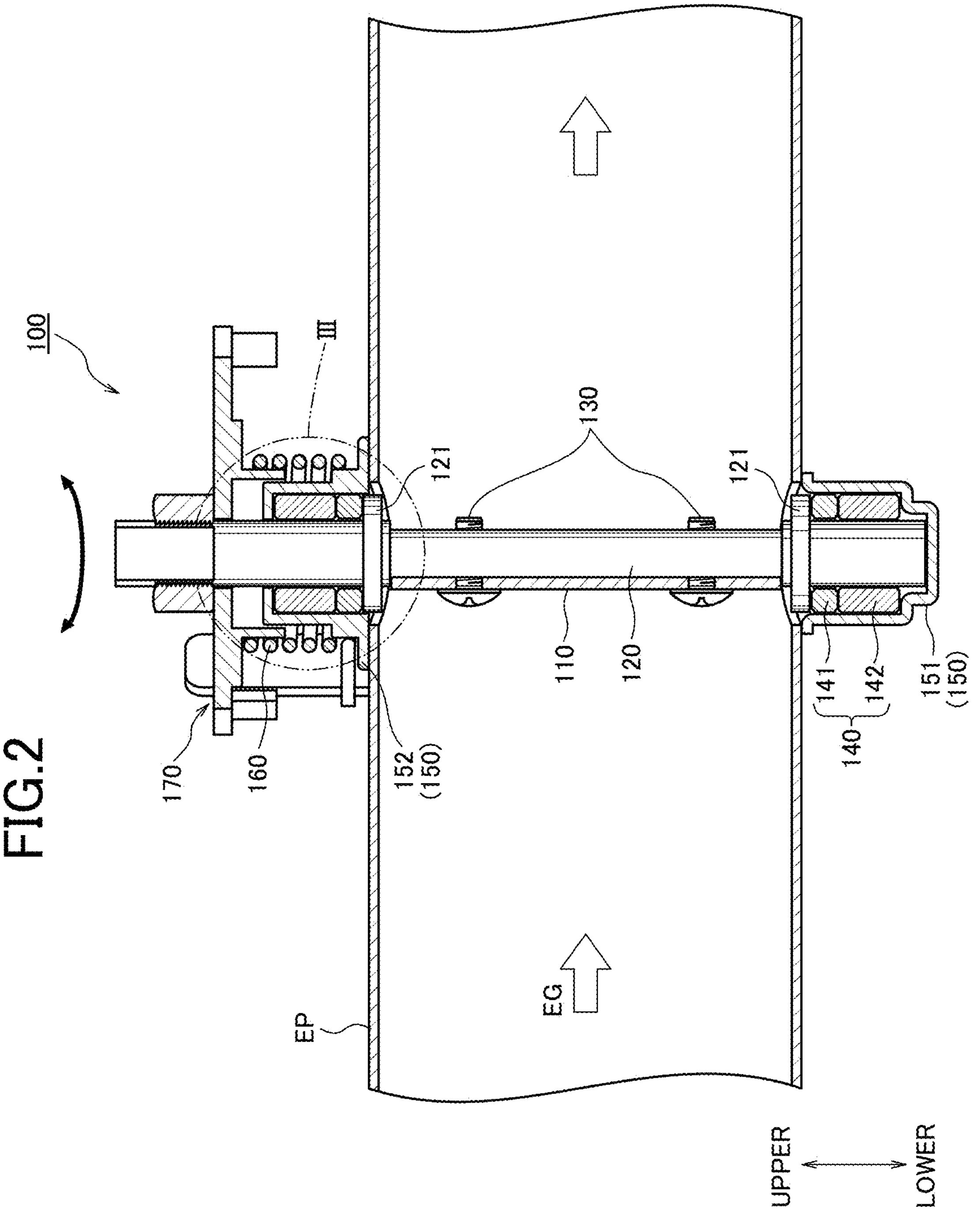
FIG. 2 is a longitudinal cross-sectional view of FIG. 1.
Figure 3:
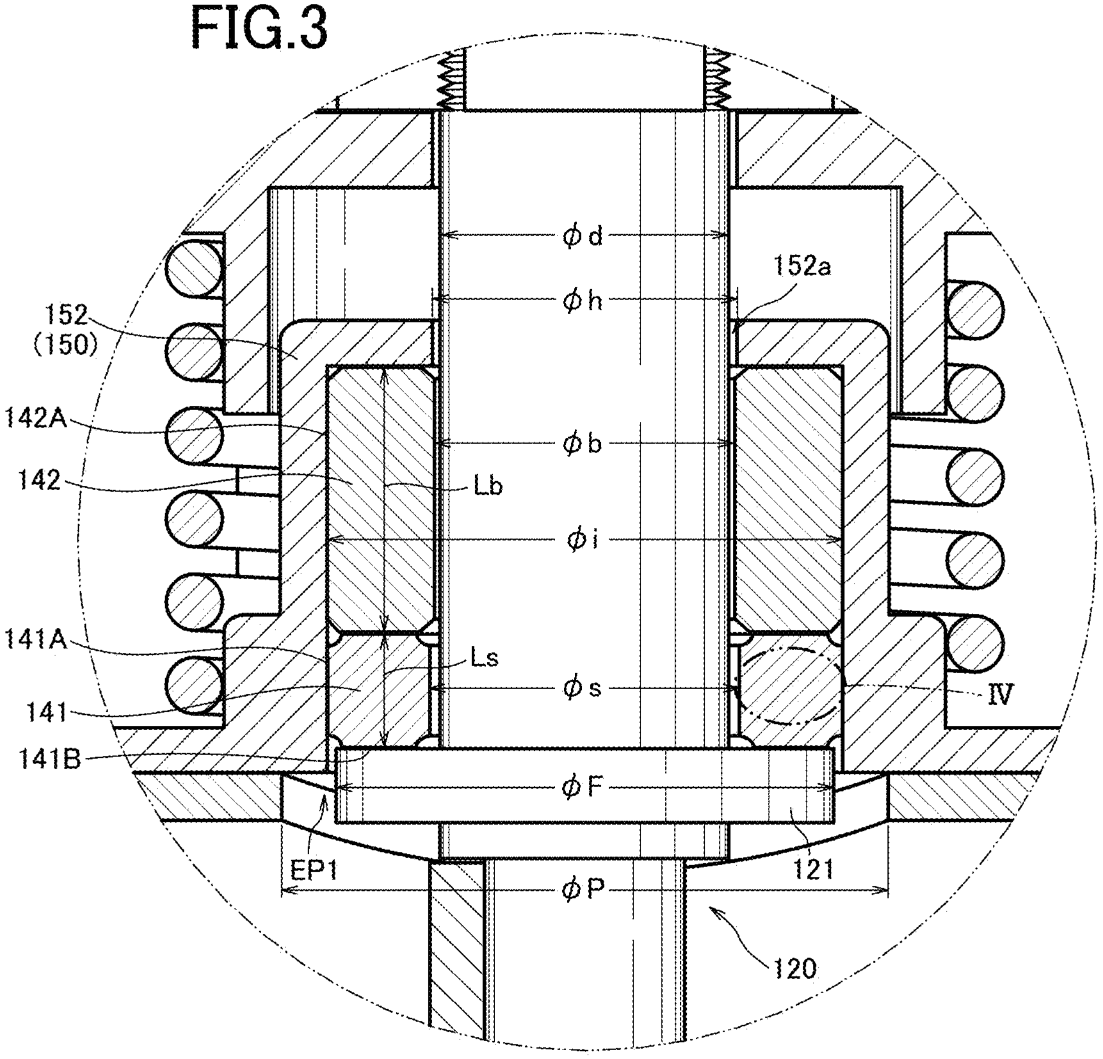
FIG. 3 is an enlarged view of part III in FIG. 2.
Figure 4:
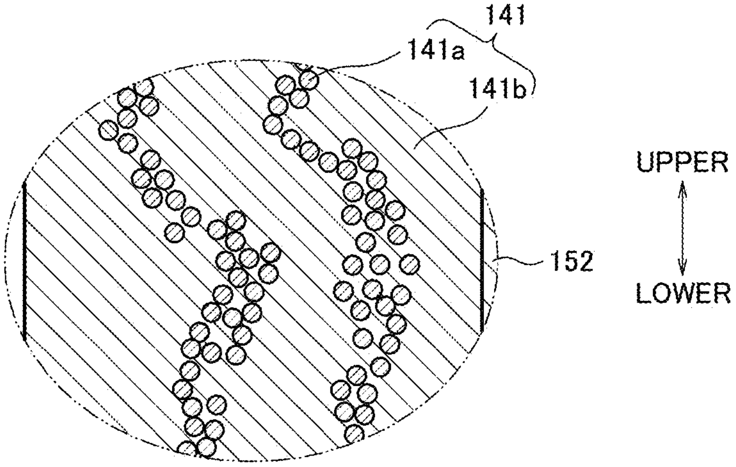
FIG. 4 is an enlarged view of part IV in FIG. 3.

FIG. 2 is a longitudinal cross-sectional view of FIG. 1, FIG. 3 is an enlarged view of part III in FIG. 2, and FIG. 4 is an enlarged view of part IV in FIG. 3.

<2.1. Main Configuration of Butterfly Valve>

As shown in FIGS. 1 and 2, the butterfly valve 100 includes a disk-shaped valve plate 110 provided in the exhaust pipe EP, a valve shaft 120 that crosses the exhaust pipe EP and holds the valve plate 110, a connecting bolt 130 that connects the valve plate 110 and the valve shaft 120, a bearing unit 140 that slidably supports the valve shaft 120, and a housing 150 that is attached to the exhaust pipe E and accommodates the bearing unit 140 arranged outside the exhaust pipe EP.

<2.1.1. Valve Plate>

The valve plate 110 is provided on the upstream side of the valve shaft 120, as shown in FIG. 2.

Thereby, even if the back pressure of exhaust gas EG is applied to the valve plate 110, the valve plate 110 is pressed against the valve shaft 120, so that the valve plate 110 is hard to detach from the valve shaft 120.

<2.1.2. Valve Shaft>

As shown in FIG. 2, flanges 121 are formed at both ends of the valve shaft 120 and protrude in the radial direction.

As shown in FIG. 3, a diameter φF of the flange 121 is smaller than a diameter φP of a shaft insertion hole EP1 formed in the exhaust pipe EP.

Further, as shown in FIG. 3, the diameter of the valve shaft 120 outward from the flange 121 is constant up to the end.

Furthermore, a male thread is formed at one end (upper end in FIG. 2) of the valve shaft 120.

<2.1.3 Bearing Unit>

As shown in FIG. 2, the bearing unit 140 consists of an annular sealing bush 141 and an annular support bush 142, into which the valve shaft 120 is inserted.

As shown in FIGS. 2 and 3, the sealing bush 141 is a separate component from the support bush 142 and is softer than the support bush 142 (for example, the Young's modulus of the sealing bush 141 is 0.15 to 0.5 GPa or more, Poisson's ratio is approximately 0.2 to 0.3, and compressive strength is 46 MPa or less).

The sealing bush 141 is in pressure contact with the housing 150 on an outer peripheral surface 141A and is in contact with the flange 121 of the valve shaft 120 on a valve shaft opposing surface 141B.

Therefore, the space between the sealing bush 141 and the housing 150 is sealed, and the space between the sealing bush 141 and the flange 121 of the valve shaft 120 is also sealed.

Further, an inner diameter φs of the sealing bush 141 is slightly larger than an inner diameter φb of the support bush 142.

Here, the inner diameter φs of the sealing bush 141 may be equal to the inner diameter φb of the support bush 142.

As shown in FIG. 4, the sealing bush 141 is formed from mesh-like metal aggregate 141*a* woven with metal wires (stainless wires in the present example) and graphite 141*b* filled in the metal aggregate 141*a*.

The metal aggregate 141*a* is repeatedly bent in the axial direction of the sealing bush 141 (that is, the direction in which the valve shaft 120 extends; the upper-lower direction in FIG. 4).

Therefore, the metal aggregate 141*a* easily expands in the axial direction.

The graphite 141*b* is expanded graphite in order to easily enter gaps in the metal aggregate 141*a*.

In the present example, the support bush 142 is made of stainless steel as the housing 150 is, and has substantially the same linear expansion coefficient as the housing 150.

Thereby, when the butterfly valve 100 becomes high temperature due to exhaust gas or the like, the support bush 142 also expands as well as the housing 150, so that the space between the support bush 142 and the housing 150 can be kept sealed.

As shown in FIGS. 2 and 3, the support bush 142 is arranged between the housing 150 and the sealing bush 141 and is in pressure contact with the housing 150 on an outer peripheral surface 142A.

Further, an axial length Lb of the support bush 142 is longer than an axial length Ls of the sealing bush 141.

<2.1.4 Housing>

The housing 150 is a component that covers the shaft insertion hole EP1 of the exhaust pipe EP, and as shown in FIG. 2, consists of a cylindrical fixed side housing 151 with a flange and a bottom, which is attached to the lower side of the exhaust pipe EP, and a cylindrical detachable side housing 152 with a flange and a bottom, which is attached to the upper side of the exhaust pipe EP.

The fixed side housing 151 is integrated with the exhaust pipe EP by welding or the like so that the exhaust gas EG does not leak from the space between the fixed side housing 151 and the exhaust pipe EP.

The detachable side housing 152 is in contact with the exhaust pipe EP, and as shown in FIG. 3, a through hole 152*a* through which the valve shaft 120 is inserted is formed in the bottom surface.

As shown in FIG. 3, a diameter φh of the through hole 152*a* is slightly larger than a diameter φd of the valve shaft 120.

Further, as shown in FIG. 3, the inner diameter of the housing 150 (that is, the inner diameter of the fixed side housing 151 and the inner diameter of the detachable side housing 152) φi is slightly larger than the diameter φF of the flange 121 of the valve shaft 120 and is smaller than the diameter φP of the shaft insertion hole EP1 of the exhaust pipe EP.

<2.2. Other Configurations of Butterfly Valve>

Further, the butterfly valve 100 includes a coiled pressing spring 160 that presses the detachable side housing 152 against the exhaust pipe EP, and a valve shaft rotation mechanism 170 that rotates the valve shaft 120.

<2.2.1 Pressing Spring>

As shown in FIG. 2, the pressing spring 160 is a torsion coil spring, is arranged between the detachable side housing 152 and the valve shaft rotation mechanism 170, and biases the detachable side housing 152 toward the exhaust pipe EP.

Due to this pressing spring 160, the detachable side housing 152 is in contact with the exhaust pipe EP so that the exhaust gas EG does not leak from the space between the detachable side housing 152 and the exhaust pipe EP.

<2.2.2 Valve Shaft Rotation Mechanism

As shown in FIG. 1, the valve shaft rotation mechanism 170 includes an annular rotary plate 171 that is in contact with the other end of the pressing spring 160, a fixing nut 172 that fixes the rotary plate 171 to the valve shaft 120, and a stopper 173 that bends up from the exhaust pipe EP and stops rotation of the rotary plate 171 and a valve shaft drive actuator (not shown) that rotates the valve shaft 120.

Here, when the valve plate 110 closes the exhaust pipe EP as shown in FIG. 1, the pressing spring 160 is being twisted by the valve shaft drive actuator.

In other words, when the pressing spring 160 is not twisted, that is, when the valve shaft drive actuator is not operating, the valve plate 110 does not close the exhaust pipe EP, and the exhaust gas EG can freely flow through the exhaust pipe EP.

The rotary plate 171 rotates together with the valve shaft 120, and as shown in FIG. 1, includes a spring suppressing portion 171*a*, which bends down from the rotary plate 171 and is in contact with a tip portion on one end side of the pressing spring 160, and two arm portions 171*b* that come into contact with the stopper 173.

The spring suppressing portion 171*a* is L-shaped, and is in contact with the tip portion of one end of the pressing spring 160 on two sides.

The arm portion 171*b* is formed of a horizontal portion that extends in the horizontal direction and a bending-down portion that bends down from the tip of the horizontal portion and comes into contact with the stopper 173.

Here, since the two arm portions 171*b* are formed, the valve shaft 120 (that is, the valve plate 110) is rotatable within an angular range between the two arm portions 171*b*.

A female thread is formed on the inner surface of the fixing nut 172 and is screwed by a male thread formed on the valve shaft 120.

Thereby, by screwing the fixing nut 172 onto the valve shaft 120 in a state where the valve shaft 120 is inserted into the rotary plate 171, the pressing spring 160 is compressed and the detachable side housing 152 is pressed against the exhaust pipe EP.

As shown in FIG. 1, the stopper 173 is in contact with not only the arm portion 171*b* of the rotary plate 171 but also the tip portion of the other end of the pressing spring 160.

<3. Effect:

According to the butterfly valve 100 of the present example described above, the sealing bush 141, which is a separate component from the support bush 142 of the bearing unit 140, is contact with the housing 150 (fixed side housing 151, detachable side housing 152) on the outer peripheral surface 141A of the sealing bush 141 and is in contact with the flange 121 of the valve shaft 120 at the valve shaft opposing surface 141B of the sealing bush 141. Thereby, since the space between the housing 150 and the bearing unit 140 is sealed and the space between the valve shaft 120 and the bearing unit 140 is also sealed, it is possible to prevent the exhaust gas EG flowing inside the exhaust pipe EP from leaking out of the exhaust pipe EP via the housing 150.

Further, the support bush 142 of the bearing unit 140 is arranged between the housing 150 and the sealing bush 141 of the bearing unit 140 and is in contact with the housing 150 on the outer peripheral surface 142A of the support bush 142. Thereby, since the support bush 142 supports the radial load on the valve plate 110 caused by the exhaust gas EG flowing in the exhaust pipe EP, even if a high load is applied to the valve plate 110 when the valve plate 110 closes the exhaust pipe EP, it is possible to prevent deformation, abnormal friction and the like of the sealing bush 141.

Therefore, even under high back pressure, it is possible to prevent the exhaust gas EG from leaking out of the exhaust pipe EP.

That is, although there is generally a trade-off relationship between load-bearing performance and sealing performance, by adopting the configuration in which the bearing unit 140 is consisted of two components as in the butterfly valve 100 of the present example, load-bearing performance and sealing performance can be both achieved.

Further, even if the sealing bush 141 and the flange 121 of the valve shaft 120 are stuck together due to rust or the like, since the outer peripheral surface 141A of the sealing bush 141 and the housing 150 slide while the sealing bush 141 and the support bush 142 slide, this butterfly valve can continue to function.

Further, the sealing bush 141 seals the space between the exhaust pipe EP and the housing 150. Thereby, since condensed water in the exhaust pipe EP is less likely to enter the support bush 142, the support bush 142 is less likely to rust.

Further, the sealing bush 141 of the bearing unit 140 is softer than the support bush 142 of the bearing unit 140. Thereby, compared to the case where the sealing bush 141 is harder than the support bush 142, the sealing bush 141 easily deforms by following the shape of the housing 150 or the flange 121 of the valve shaft 120.

Further, the inner diameter φs of the sealing bush 141 is larger than or equal to the inner diameter φb of the support bush 142. Thereby, the valve shaft 120 comes into contact with the inner peripheral surface of the support bush 142 that is harder than the sealing bush 141 before coming into contact with the inner peripheral surface of the sealing bush 141.

Therefore, even under high back pressure, it is possible to reliably prevent the exhaust gas EG from leaking out of the exhaust pipe EP.

Further, the axial length Lb of the support bush 142 is longer than the axial length Ls of the sealing bush 141. Thereby, compared to the case where the axial length Lb of the support bush 142 is shorter than the axial length Ls of the sealing bush 141, since the surface pressure applied to the support bush 142 is reduced when a high load is applied to the valve plate 110 in a state where the valve plate 110 closes the exhaust pipe EP, it is possible to further improve the radial load resistance performance of the bearing unit 140.

Further, the sealing bush 141 is formed from the mesh-like metal aggregate 141*a* woven with metal wires (stainless steel wires) and the graphite 141*b* filled in the metal aggregate 141*a*, and the metal aggregate 141*a* is repeatedly bent in the axial direction of the sealing bush 141. Thereby, since the sealing bush 141 expands more easily in the axial direction than in the radial direction and the cushioning properties of the sealing bush 141 in the axial direction are improved, it is possible to further improve the sealing performance between the sealing bush 141 and the flange 121 of the valve shaft 120.

Further, as shown in FIG. 4, the graphite 141*b*, which has a smaller friction coefficient than the metal aggregate 141*a*, is exposed on the surface of the sealing bush 141. Thereby, the torque for rotating the valve shaft 120 is reduced, and it is possible to downsize the shaft drive actuator.

Further, the metal aggregate 141*a* is woven with stainless steel wires. Thereby, since the sealing bush 141 has cushioning properties, the sealing bush 141 is less likely to be shaved when the sealing bush 141 is press-fitted into the housing 150, and even if the valve shaft 120 is slightly tilted, the valve shaft 120 can be stably supported and vertical vibrations can be absorbed when the automatic four-wheeled vehicle is running.

Example 2

Next, a butterfly valve 200 according to the second example of the present invention will be described based on FIG. 5, which is an enlarged sectional view of a main part of a butterfly valve according to the second example of the present invention.

Here, the butterfly valve 200 in the second example is a butterfly valve in which the shape of the bearing unit 140 in the butterfly valve 100 in the first example is modified, and has many components in common with the butterfly valve 100 in the first example. Thus, detailed explanation of common components will be omitted, and only 200-series signs with the same last two digits will be given.

Figure 5:
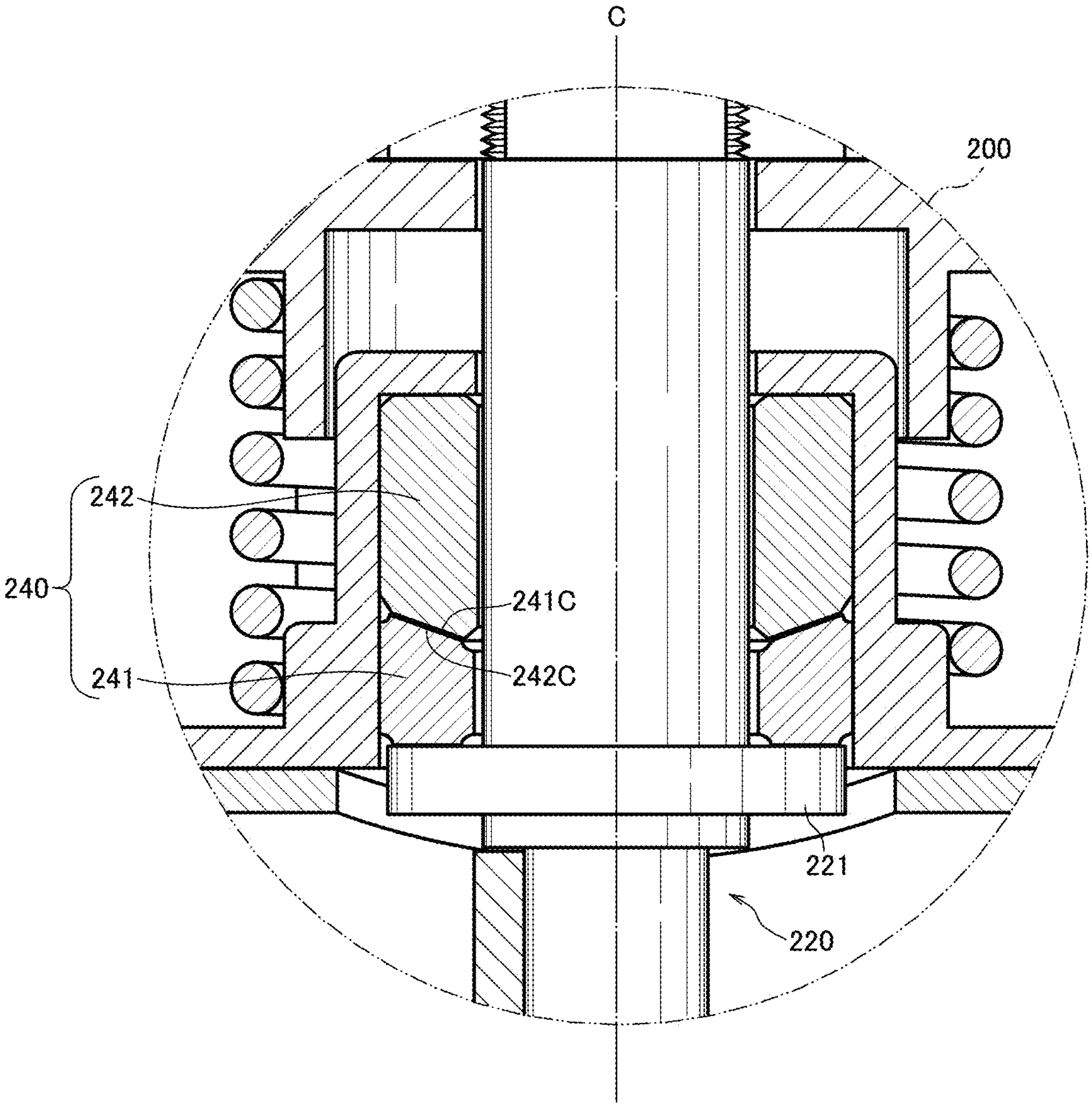
FIG. 5 is an enlarged sectional view of a main part of a butterfly valve according to the second example of the present invention.

As shown in FIG. 5, in a bearing unit 240 in the second example, a support bush opposing surface 241C of a sealing bush 241 is inclined in the direction toward a central axis C of a valve shaft 220 and in the direction toward a flange 221 of the valve shaft 220.

Here, the support bush opposing surface 241C may be inclined in the direction toward the central axis C of the valve shaft 220 and in the direction away from the flange 221 of the valve shaft 220.

A sealing bush opposing surface 242C of a support bush 242 is also inclined toward the central axis C of the valve shaft 220 in correspondence with the support bush opposing surface 241C of the sealing bush 241.

The butterfly valve 200 formed in this way in the second example has the structure in which the support bush opposing surface 241C of the sealing bush 241 and the sealing bush opposing surface 242C of the support bush 242 are inclined in correspondence with each other. Thereby, since the sealing bush 241 and the support bush 242 can be easily positioned in the radial direction, it is possible to efficiently assemble the bearing unit 240.

Example 3

Next, a butterfly valve 300 according to the third example of the present invention will be described based on FIG. 6, which is an enlarged sectional view of a main part of a butterfly valve according to the third example of the present invention.

Here, the butterfly valve 300 in the third example is a butterfly valve in which the shapes of the valve shaft 120 and the bearing unit 140 in the butterfly valve 100 in the first example are modified, and has many components in common with the butterfly valve 100 in the first example. Thus, detailed explanation of common components will be omitted, and only 300-series signs with the same last two digits will be given.

Figure 6:
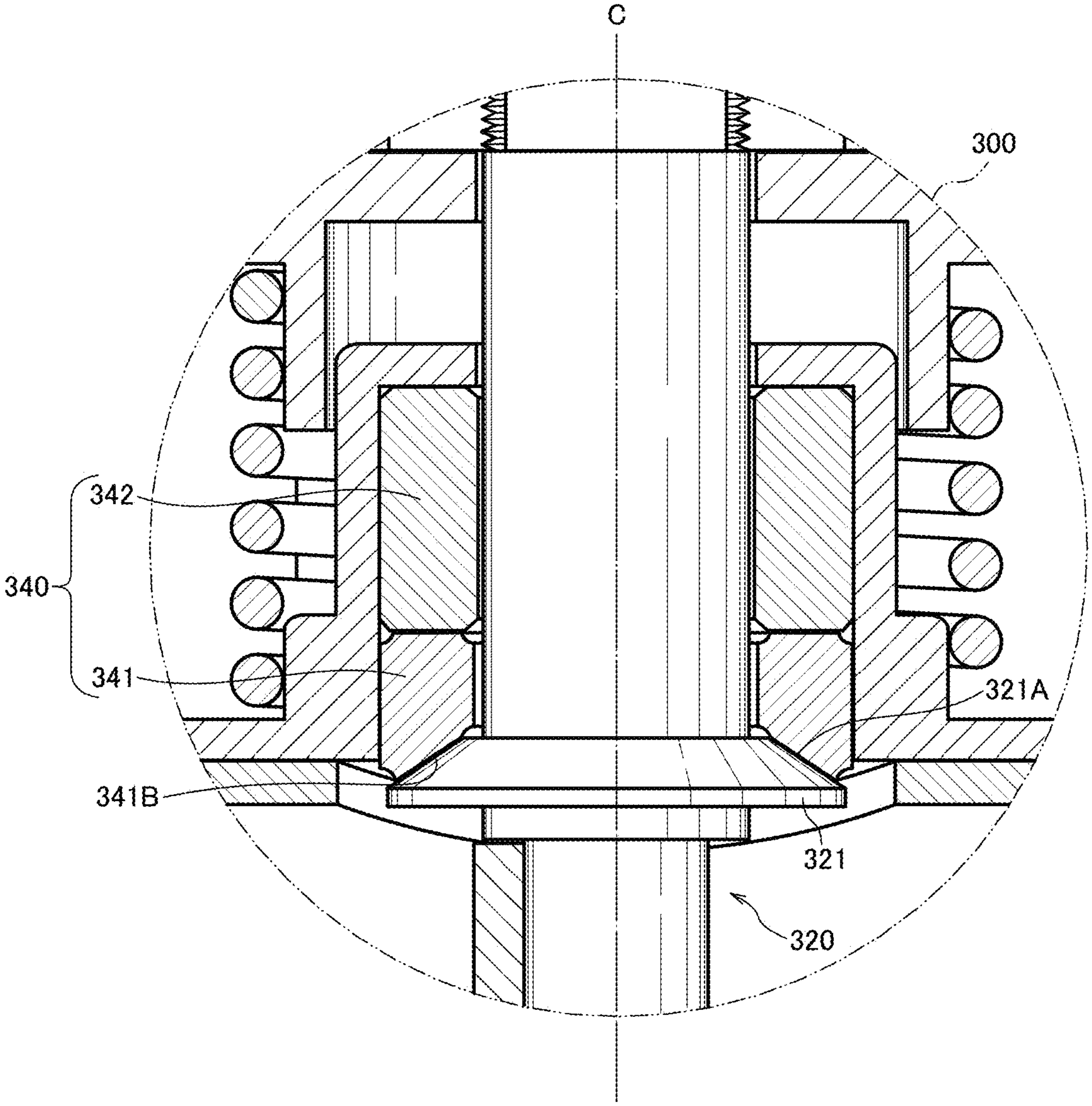
FIG. 6 is an enlarged sectional view of a main part of a butterfly valve according to the third example of the present invention.

As shown in FIG. 6, a sealing bush contact surface 321A of a flange 321 of a valve shaft 320 in the third example is inclined in the direction toward the central axis C of the valve shaft 320 and in the direction away from the exhaust pipe EP.

Here, the sealing bush contact surface 321A may be inclined in the direction toward the valve shaft 320 and in the direction approaching to the exhaust pipe EP.

A valve shaft opposing surface 341B of a sealing bush 341 is also inclined toward the central axis C of the valve shaft 320 in correspondence with the sealing bush contact surface 321A of the valve shaft 320.

The butterfly valve 300 formed in this way in the third example has the structure in which the sealing bush contact surface 321A of the valve shaft 320 and the valve shaft opposing surface 341B of the sealing bush 341 are inclined in correspondence with each other. Thereby, since the valve shaft 320 is positioned relative to a bearing unit 340, it is possible to reliably seal the space between the valve shaft 320 and the bearing unit 340 and reliably support the valve shaft 320.

Example 4

Next, a butterfly valve 400 according to the fourth example of the present invention will be described based on FIG. 7, which is an enlarged sectional view of a main part of a butterfly valve according to the fourth example of the present invention.

Here, the butterfly valve 400 in the fourth example is a butterfly valve in which the shapes of the valve shaft 120 and the bearing unit 140 in the butterfly valve 100 in the first example are modified, and has many components in common with the butterfly valve 100 in the first example. Thus, detailed explanation of common components will be omitted, and only 400-series signs with the same last two digits will be given.

Figure 7:
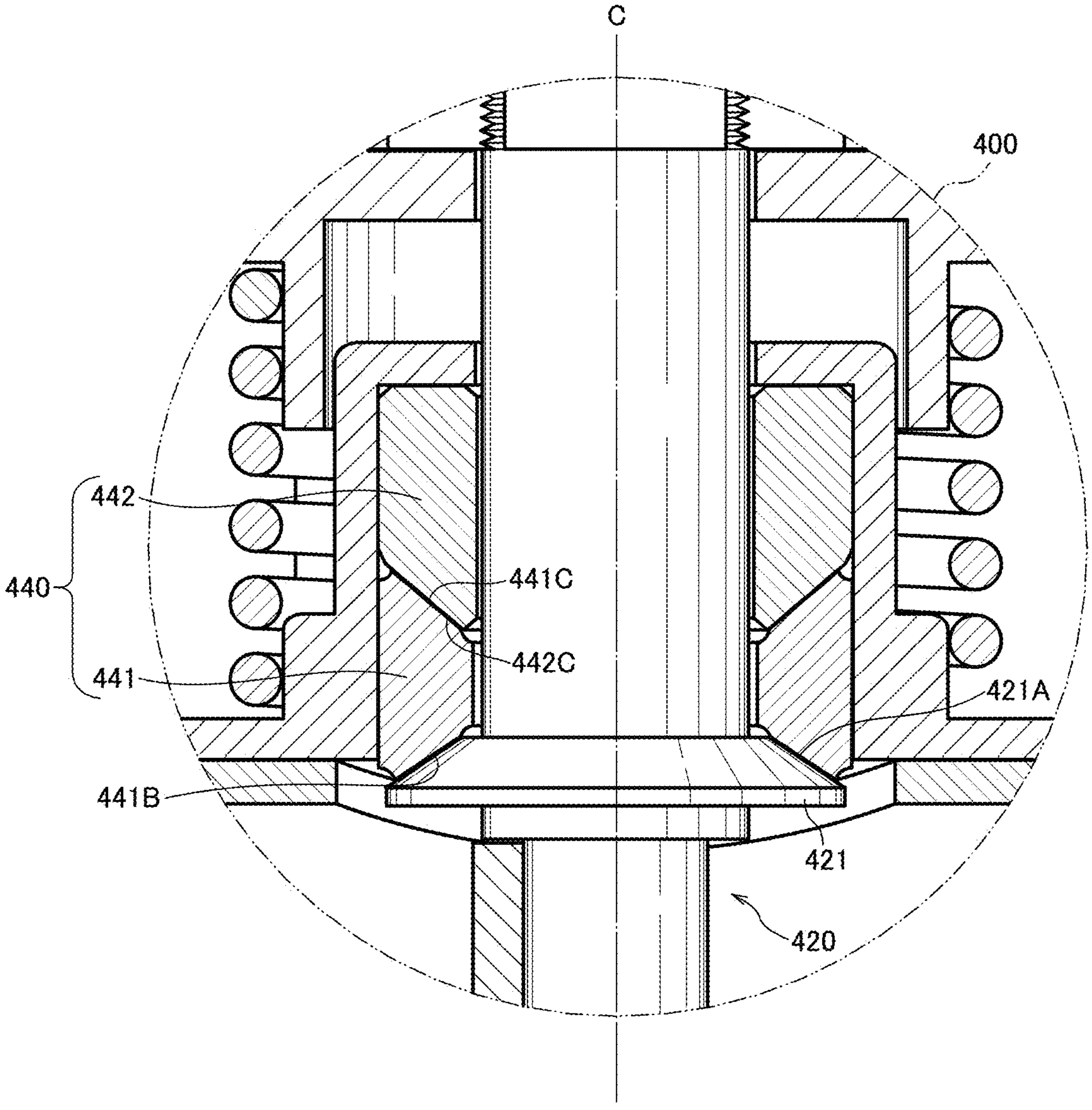
FIG. 7 is an enlarged sectional view of a main part of a butterfly valve according to the fourth example of the present invention.

As shown in FIG. 7, a sealing bush contact surface 421A of a flange 421 of a valve shaft 420 in the fourth example is inclined in the direction toward the central axis C of the valve shaft 420 and in the direction away from the exhaust pipe EP.

A valve shaft opposing surface 441B of a sealing bush 441 is also inclined toward the central axis C of the valve shaft 420 in correspondence with the sealing bush contact surface 421A of the valve shaft 420.

Further, a support bush opposing surface 441C of the sealing bush 441 is inclined in the direction toward the central axis C of the valve shaft 420 and in the direction toward the flange 421 of the valve shaft 420.

Here, the inclination angle of the valve shaft opposing surface 441B of the sealing bush 441 is equal to the inclination angle of the support bush opposing surface 441C of the sealing bush 441.

A sealing bush opposing surface 442C of a support bush 442 is also inclined toward the central axis C of the valve shaft 420 in correspondence with the support bush opposing surface 441C of the sealing bush 441.

Here, the sealing bush contact surface 421A of the valve shaft 420 may be inclined in the direction toward the valve shaft 420 and in the direction approaching to the exhaust pipe EP.

Further, the support bush opposing surface 441C of the sealing bush 441 may be inclined in the direction toward the central axis C of the valve shaft 420 and in the direction away from the flange 421 of the valve shaft 420.

The butterfly valve 400 formed in this way in the fourth example has the structure in which the support bush opposing surface 441C of the sealing bush 441 and the sealing bush opposing surface 442C of the support bush 442 are inclined in correspondence with each other. Thereby, since the sealing bush 441 and the support bush 442 can be easily positioned in the radial direction, it is possible to efficiently assemble the bearing unit 440.

Further, the sealing bush contact surface 421A of the valve shaft 420 and the valve shaft opposing surface 441B of the sealing bush 441 are inclined in correspondence with each other. Thereby, since the valve shaft 420 is positioned relative to a bearing unit 440, it is possible to reliably seal the space between the valve shaft 420 and the bearing unit 440 and reliably support the valve shaft 420.

Further, the inclination angle of the valve shaft opposing surface 441B of the sealing bush 441 is equal to the inclination angle of the support bush opposing surface 441C of the sealing bush 441. Thereby, since the axial directionality of the sealing bush 441 is eliminated, it is possible to suppress incorrect assembly of the sealing bush 441.

Example 5

Next, a butterfly valve 500 according to the fifth example of the present invention will be described based on FIGS. 8A and 8B.

Figure 8A:
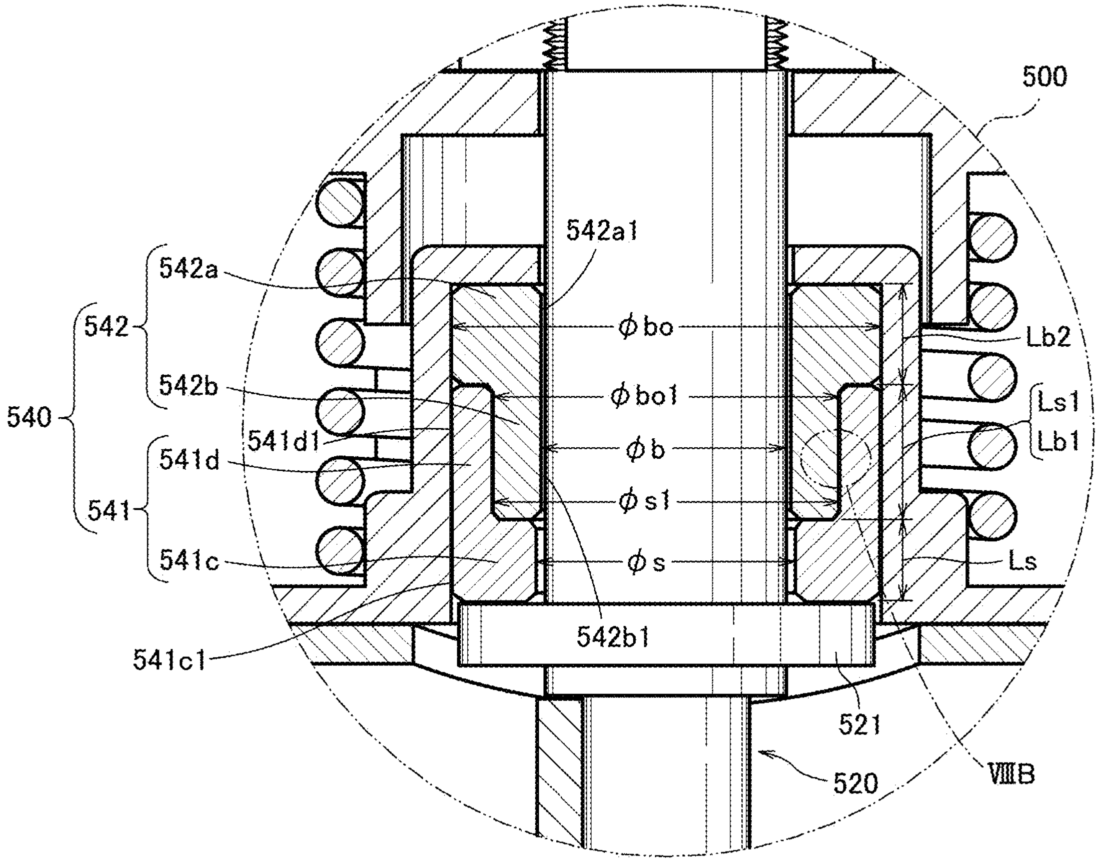
FIG. 8A is an enlarged sectional view of a main part of a butterfly valve according to the fifth example of the present invention.
Figure 8B:
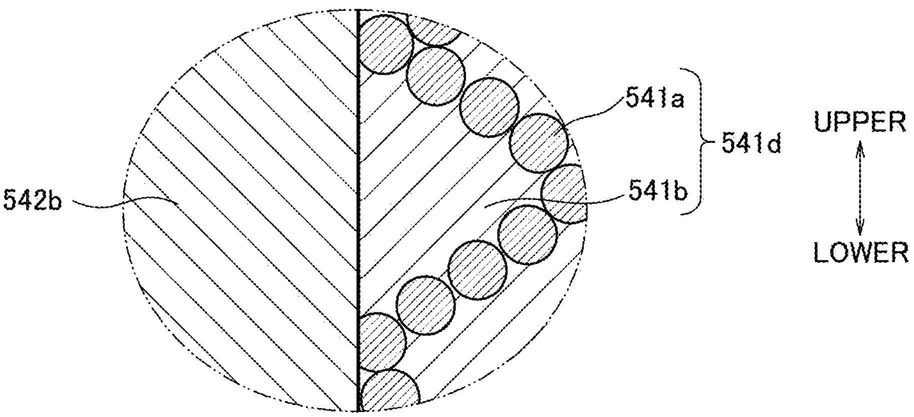
FIG. 8B is an enlarged view of part VIIIB in FIG. 8A.

FIG. 8A is an enlarged sectional view of a main part of a butterfly valve according to the fifth example of the present invention, and FIG. 8B is an enlarged view of part VIIIB in FIG. 8A.

Here, the butterfly valve 500 in the fifth example is a butterfly valve in which the shape of the bearing unit 140 in the butterfly valve 100 in the first example is modified, and has many components in common with the butterfly valve 100 in the first example. Thus, detailed explanation of common components will be omitted, and only 500-series signs with the same last two digits will be given.

As shown in FIG. 8A, in a bearing unit 540 in the fifth example, a support bush 542 is inserted into a sealing bush 541.

<1. Sealing Bush>

The sealing bush 541 is formed from a cylindrical base 541*c* and a cylindrical protrusion 541*d* that protrudes from the base 541*c* in the axial direction.

As shown in FIG. 8A, an outer peripheral surface 541*d*1 of the protrusion 541*d* is flush with an outer peripheral surface 541*c*1 of the base 541*c*.

Further, as shown in FIG. 8A, an inner diameter φs1 of the protrusion 541*d* is larger than the inner diameter φs of the base 541*c*.

Further, as shown in FIG. 8A, an axial length Ls1 of the protrusion 541*d* is longer than the axial length Ls of the base 541*c*.

Further, in the sealing bush 541 in the present example, metal aggregate 541*a* is partially exposed on the inner diameter side as shown in FIG. 8B.

Therefore, the support bush 542 inserted into the sealing bush 541 engages with the metal aggregate 541*a* of the sealing bush 541.

<2. Support Bush>

The support bush 542 is formed from a cylindrical base 542*a* and a cylindrical protrusion 542*b* that protrudes from the base 542*a* in the axial direction.

An inner peripheral surface 542*b*1 of the protrusion 542*b* is flush with an inner peripheral surface 542*al* of the base 542*a*.

That is, as shown in FIG. 8A, the inner diameter φb of the protrusion 542*b* is equal to the inner diameter of the base 542*a* and is slightly smaller than the inner diameter φs of the sealing bush 541.

As shown in FIG. 8A, an outer diameter φbo1 of the protrusion 542*b* is smaller than an outer diameter φbo of the base 542*a*.

Further, as shown in FIG. 8A, the outer diameter φbo1 of the protrusion 542*b* is approximately equal to the inner diameter φs1 of the protrusion 541*d* of the sealing bush 541.

As shown in FIG. 8A, an axial length Lb1 of the protrusion 542*b* is longer than the axial length Lb2 of the base 542*a*.

Further, as shown in FIG. 8A, the axial length Lb1 of the protrusion 542*b* is approximately equal to the axial length Ls1 of the protrusion 541*d* of the sealing bush 541.

In the present example, the protrusion 542*b* of the support bush 542 is located closer to a valve shaft 520 than the protrusion 541*d* of the sealing bush 541, but the protrusion 541*d* of the sealing bush 541 may be located closer to the valve shaft 520 than the protrusion 542*b* of the support bush 542.

The butterfly valve 500 formed in this way in the fifth example has the structure in which the support bush 542 is inserted into the sealing bush 541. Thereby, since the bearing unit 540 can be easily handled as an integral member, it is possible to efficiently assemble the butterfly valve 500.

Example 6

Next, a butterfly valve 600 according to the sixth example of the present invention will be described based on FIGS. 9A and 9B.

Figure 9A:
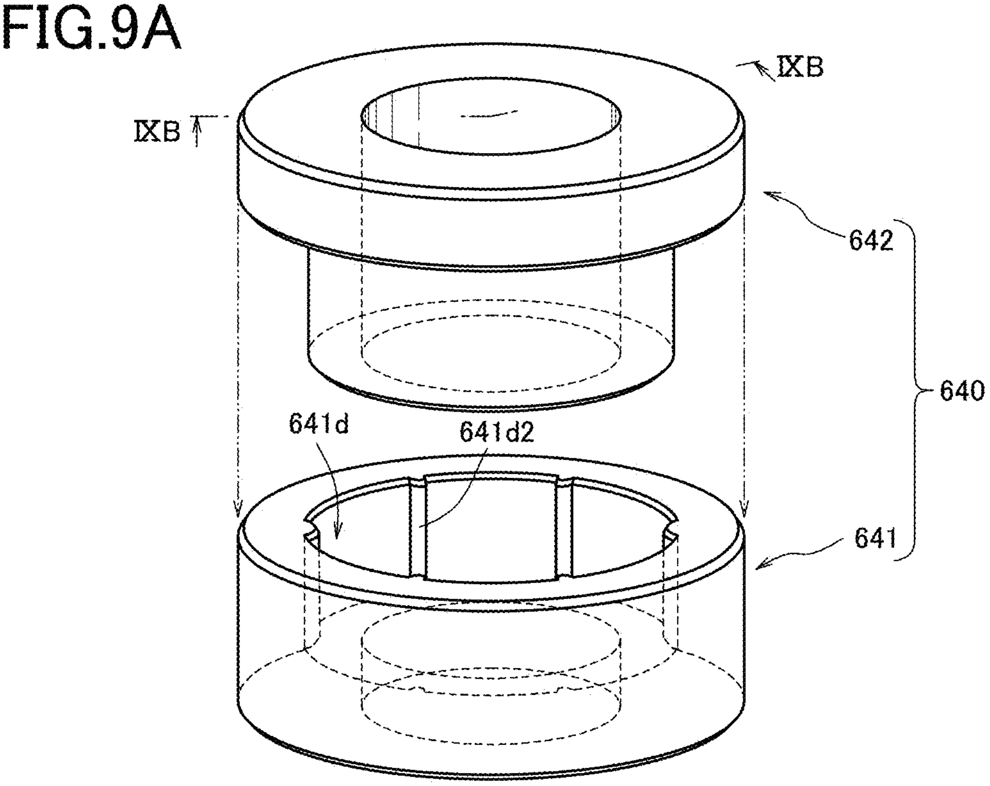
FIG. 9A is an exploded perspective view of a bearing unit in a butterfly valve according to the sixth example of the present invention.
Figure 9B:
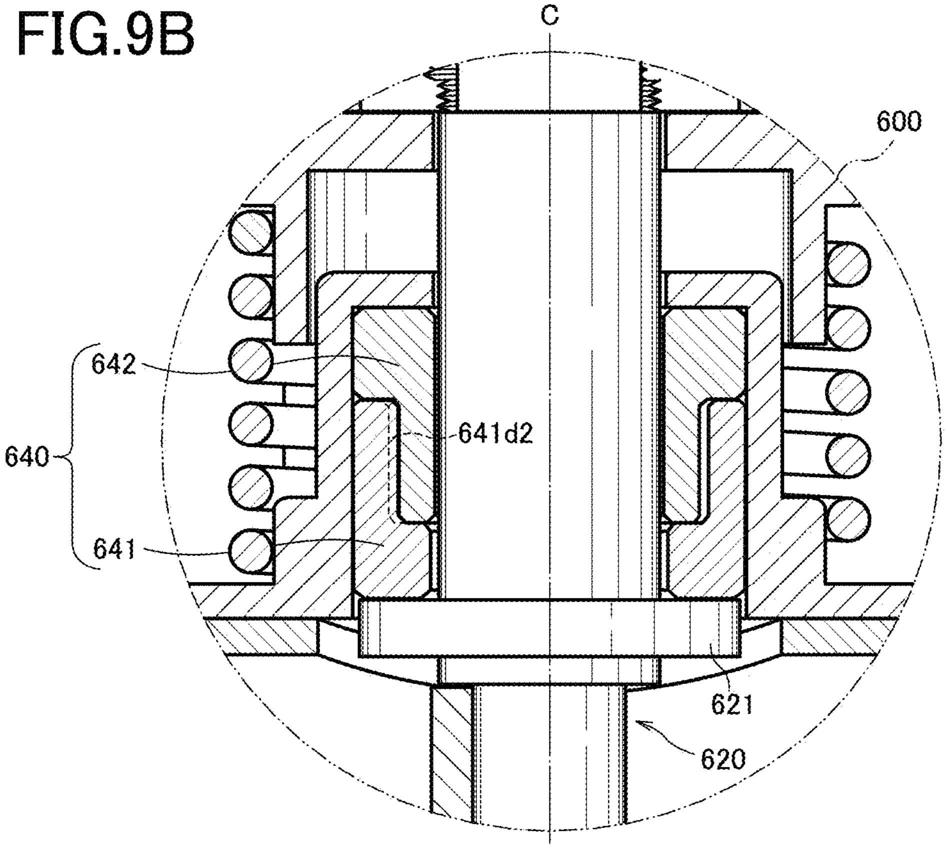
FIG. 9B is an enlarged sectional view of a main part of the butterfly valve taken along the IXB-IXB cross section in FIG. 9A.

FIG. 9A is an exploded perspective view of a bearing unit in a butterfly valve according to the sixth example of the present invention, and FIG. 9B is an enlarged sectional view of a main part of the butterfly valve taken along the IXB-IXB cross section in FIG. 9A.

Here, the butterfly valve 600 in the sixth example is a butterfly valve in which the shape of the bearing unit 540 in the butterfly valve 500 in the fifth example is modified, and has many components in common with the butterfly valve 500 in the fifth example. Thus, detailed explanation of common components will be omitted, and only 600-series signs with the same last two digits will be given.

As shown in FIG. 9A, in a bearing unit 640 in the sixth example, protrusions 641*d*2 are provided to protrude from the inner peripheral surface of a protrusion 641*d* of a sealing bush 641.

When inserting a support bush 642 into the sealing bush 641, since the sealing bush 641 is softer than the support bush 642, as shown in FIG. 9B, the protrusion 641*d*2 of the sealing bush 641 is crushed, and the support bush 642 comes into contact with a part of the sealing bush 641.

In the butterfly valve 600 formed in this way in the sixth example, the protrusion 641*d*2 is formed on the sealing bush 641. Thereby, since the protrusion 641*d*2 serves as an insertion guide when inserting the support bush 642 into the sealing bush 641, it is possible to improve the assemblability of a bearing unit 640, and even if the sealing bush 641 is stuck to a flange 621 of the valve shaft 620, since the sealing bush 641 to which the valve shaft 620 is stuck slides relative to the support bush 642, it is possible to maintain the function of the butterfly valve for a long period of time.

Modified Example

Although the butterfly valves according to the examples of the present invention have been described above, the butterfly valve in the present invention is not limited to the butterfly valves of the examples described above.

For example, in the examples described above, the metal aggregate is woven with stainless steel wires, but the metal aggregate may be woven with any metal wires as long as they are metal wires. However, in order to reliably seal the space between the housing and the sealing bush, it is preferable that the metal aggregate is woven with metal wires having the linear expansion coefficient comparable to that of the material of the housing.

For example, in the examples described above, the valve plate is provided on the upstream side of the valve shaft. However, the position of the valve plate is not limited to there, and the valve plate may be provided on the downstream side of the valve shaft.

For example, in the examples described above, the support bush is made of stainless steel as the housing is. However, the material of the support bush is not limited to this material, and may be made of, for example, hard carbon or ceramics.

REFERENCE SIGNS LIST

100, 200, 300, 400, 500, 600 butterfly valve
110 valve plate
120, 220, 320, 420, 520 valve shaft
121, 321, 421 flange
321A, 421A sealing bush contact surface
130 connecting bolt
140, 240, 340, 440, 540 bearing unit
141, 241, 341, 441, 541, 641 sealing bush

141A outer peripheral surface
141B, 341B, 441B valve shaft opposing surface
241C, 441C support bush opposing surface
141*a*, 541*a* metal aggregate
141*b*, 541*b* graphite
541*c* base
541*c*1 outer peripheral surface
541*d*, 641*d* protrusion
541*d*1 outer peripheral surface
641*d*2 protrusion
142, 242, 342, 442, 542, 642 support bush
142A outer peripheral surface
242C, 442C sealing bush opposing surface
542*a* base
542*a*1 inner peripheral surface
542*b* protrusion
542*b*1 inner peripheral surface
150 housing
151 fixed side housing
152 detachable side housing
160 pressing spring
170 valve shaft rotation mechanism
171 rotary plate
171*a* spring suppressing portion
171*b* arm portion
172 fixing nut
173 stopper
EP1 shaft insertion hole
EP exhaust pipe
EG exhaust gas
C central axis of valve shaft
φF diameter of flange
φi inner diameter of housing
φP diameter of shaft insertion hole of exhaust pipe
φs inner diameter of sealing bush (base)
φs1 inner diameter of protrusion of sealing bush
φb inner diameter of support bush (protrusion)
φbo outer diameter of support bush (base)
φbo1 outer diameter of protrusion of support bush
φh diameter of through hole of detachable side housing
φd diameter of valve shaft
Ls axial length of sealing bush (base)
Ls1 axial length of sealing bush (protrusion)
Lb axial length of support bush
Lb1 axial length of sealing bush (protrusion)
Ls2 axial length of sealing bush (base)

The invention claimed is:

1. A butterfly valve for opening and closing an exhaust pipe communicating with an exhaust port of an engine, the butterfly valve comprising: a valve plate provided in the exhaust pipe; a valve shaft configured to cross the exhaust pipe and hold the valve plate; a bearing unit comprising an annular sealing bush and an annular support bush, which are separate components and into which the valve shaft is inserted, the bearing unit configured to slidably support the valve shaft; and a housing attached to the exhaust pipe and configured to accommodate the bearing unit arranged outside the exhaust pipe, wherein the support bush of the bearing unit is arranged between the housing and the sealing bush of the bearing unit and is in contact with the housing on an outer peripheral surface of the support bush, wherein the sealing bush of the bearing unit is in contact with the housing on an outer peripheral surface of the sealing bush and is in contact with a flange of the valve shaft on a valve shaft opposing surface of the sealing bush, wherein the support bush comprises a first surface and a second surface opposing each other and crossing the outer peripheral surface of the support bush, wherein the sealing bush comprises a first surface and a second surface opposing each other and crossing the outer peripheral surface of the sealing bush, wherein the first surface of the sealing bush is in contact with the second surface of the support bush, wherein a surface of the flange facing the second surface of the sealing bush has a width greater than a width of the valve shaft, wherein the housing is disposed to overlap the sealing bush and the support bush in a direction extending from the first surface of the support bush to the second surface of the sealing bush, and wherein the housing surrounds at least the outer peripheral surfaces and the first surfaces of the support bush and the sealing bush, wherein the housing comprises: a fixed side housing with a flange and a bottom, and a detachable side housing with a flange and a bottom, and wherein each of the fixed side housing and the detachable side housing comprise the bearing unit, wherein the fixed side housing and the detachable side housing are disposed on opposing sides of the exhaust pipe, wherein a through hole through which the valve shaft is inserted is formed in the bottom of the detachable side housing, wherein a diameter of the through hole is larger than a diameter of the valve shaft, and wherein each of an inner diameter of the fixed side housing and an inner diameter of the detachable side housing is larger than a diameter of the flange of the valve shaft and smaller than a diameter of a shaft insertion hole of the exhaust pipe.

2. The butterfly valve according to claim 1, wherein the sealing bush of the bearing unit is softer than the support bush of the bearing unit, and
wherein an inner diameter of the sealing bush is larger than or equal to an inner diameter of the support bush.

3. The butterfly valve according to claim 1, wherein axial length of the support bush is longer than axial length of the sealing bush.

4. The butterfly valve according to claim 1, wherein the sealing bush is formed from mesh-like metal aggregate woven with metal wires and graphite filled in the metal aggregate, and
wherein the metal aggregate is repeatedly bent in the axial direction of the sealing bush.

5. The butterfly valve according to claim 2, wherein axial length of the support bush is longer than axial length of the sealing bush.

6. The butterfly valve according to claim 2, wherein the sealing bush is formed from mesh-like metal aggregate woven with metal wires and graphite filled in the metal aggregate, and
wherein the metal aggregate is repeatedly bent in the axial direction of the sealing bush.

7. The butterfly valve according to claim 3, wherein the sealing bush is formed from mesh-like metal aggregate woven with metal wires and graphite filled in the metal aggregate, and
wherein the metal aggregate is repeatedly bent in the axial direction of the sealing bush.

8. The butterfly valve according to claim 1, wherein the first surface of the support bush is in contact with the housing.

9. The butterfly valve according to claim 1, wherein the housing only partially overlaps an outer peripheral surface of the flange in a width direction of the flange.

10. The butterfly valve according to claim 1, wherein the fixed side housing is attached to a lower side of the exhaust pipe, and wherein the detachable side housing is attached to an upper side of the exhaust pipe opposite the lower side.

* * * * *